United States Patent Office 3,373,504
Patented Mar. 19, 1968

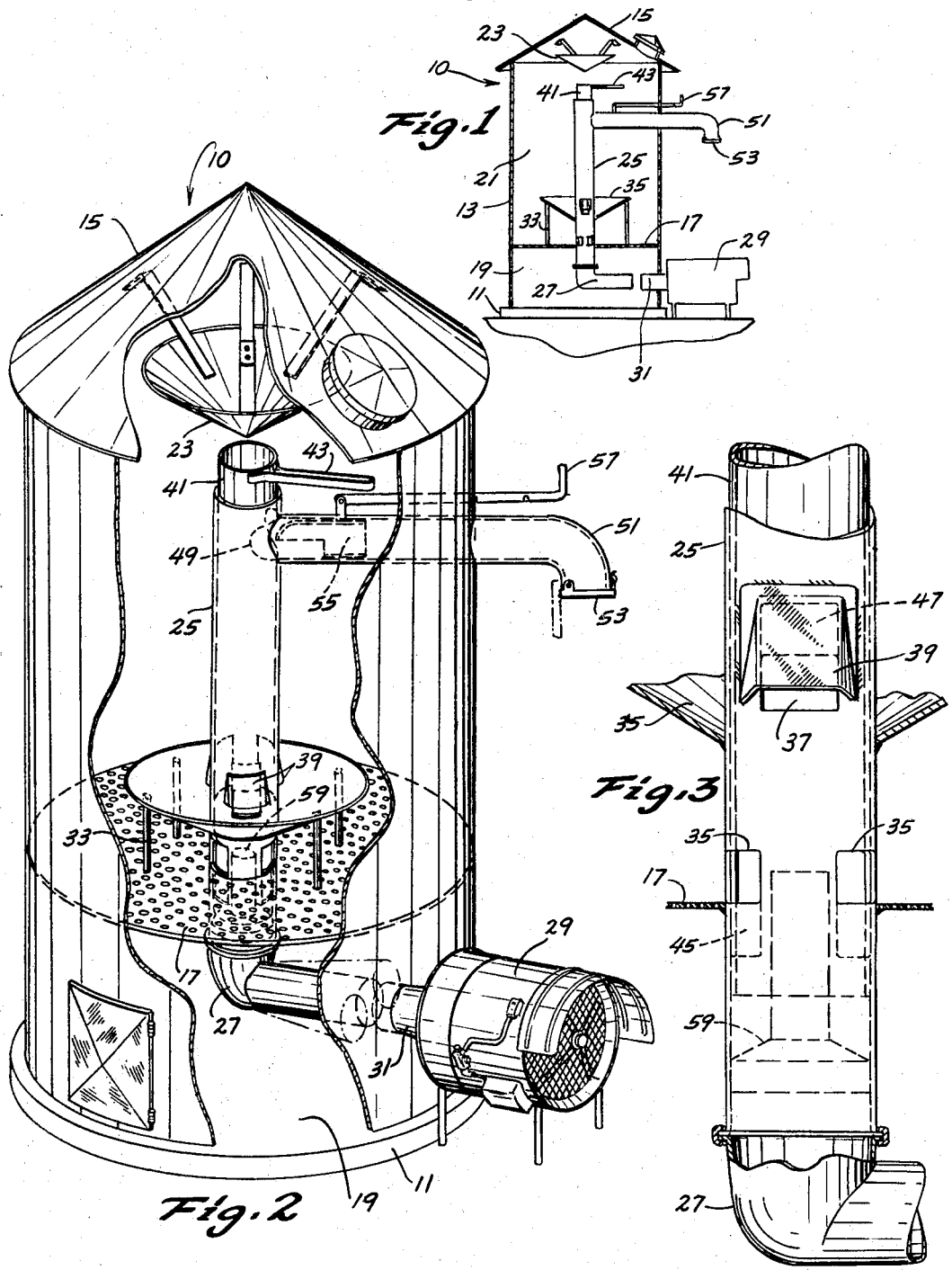

3,373,504
AIR-DRIVEN GRAIN CIRCULATING MEANS
Daryl C. McIntire, Seymour, Iowa 52590, and
Oran Clark, Corydon, Iowa 50060
Filed Apr. 20, 1965, Ser. No. 449,509
10 Claims. (Cl. 34—57)

ABSTRACT OF THE DISCLOSURE

A grain circulating means for a storage bin having a horizontal floor spaced above the bin bottom. A first pipe is vertically disposed in the bin and extends downwardly through the horizontal floor and has a plurality of spaced apart first openings positioned below a plurality of spaced apart second openings. An inverted cone-shaped central floor surrounds the first pipe between the first and second openings and a second pipe is movably mounted in and embraced by the first pipe and which has a plurality of spaced apart third and fourth openings which are adapted to register with the first and second openings at times. The second pipe is operatively connected on air means which supplies a volume of air to the interior thereof.

---

Grain stored within a storage bin must be circulated at times to dry the grain and to prevent "hot spots" from building up therein. The existing grain circulating means are undesirable for several reasons: (1) they do not uniformly circulate the grain within the storage bin, (2) they utilize expensive equipment, and (3) they are expensive to operate.

Therefore, it is a principal object of this invention to provide an air driven grain circulating means.

A further object of this invention is to provide an air driven grain circulating means which uniformly circulates the grain within the storage bin.

A further object of this invention is to provide an air driven grain circulating means which is economical of manufacture.

A further object of this invention is to provide an air driven grain circulating means which is economical to operate.

A further object of this invention is to provide an air driven grain circulating means which permits selective portions of the stored grain to be circulated.

A further object of this invention is to provide an air driven grain circulating means which has a means associated therewith for controlling the flow of air to the grain.

A further object of this invention is to provide an air driven grain circulating means which may also be used to discharge the grain from the storage bin if so desired.

A further object of this invention is to provide an air driven grain circulating means which may easily be installed into existing storage bins.

A further object of this invention is to provide an air driven grain circulating means which is durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a schematic drawing of the grain circulating means to illustrate the relationship of the component parts;

FIG. 2 is a perspective view of the grain circulating means mounted in a storage bin with portions thereof cut away to more fully illustrate the invention with broken lines indicating various movements of the associated structure; and FIG. 3 is a side elevational view of the air tubes with the control floor and auxiliary floor cut away to more fully illustrate the invention.

The numeral 10 generally designates a storage bin having a floor 11, vertical wall portion 13 and roof 15. As seen in FIGS. 1 and 2, bin 10 is provided with a perforated auxiliary floor 17 extending across the entire interior thereof which is spaced above floor 11 by any convenient means to provide an access compartment 19 and a storage compartment 21. A cone-shaped grain spreader 23 is secured to the inner surface of roof 15 as seen in FIGS. 1 and 2 by any convenient means and is positioned in the center of the storage bin.

A vertical pipe 25 is positioned within storage bin 10 as seen in the drawings and extends downwardly through floor 17 and is secured thereto by welding or the like as best seen in FIG. 3. A pipe 27 is rotatably secured to the lower end of pipe 25 as seen in FIG. 3 and extends horizontally outwardly therefrom. A conventional grain dryer 29 is positioned outside of storage bin 10 and has its air exhaust pipe 31 extending inwardly into storage bin 10 as best seen in FIG. 1. It can be seen from FIGS. 1 and 2 that pipe 27 is in horizontal alignment with pipe 31 and can be rotated with respect thereto to receive greater or lesser amounts of air from grain dryer 29.

Supported above floor 17 by leg members 33 is a cone-shaped control floor 35 which extends around pipe 25 and is secured thereto at its lower end by welding or the like. As seen in FIGS. 2 and 3, pipe 25 is provided with a plurality of equally spaced apart openings 35 formed therein at a point just above floor 17. Preferably there should be three openings 35 in pipe 25. Pipe 25 is also provided with a plurality of openings 37 formed therein at a point above the lower end of control floor 35. Preferably there should be three openings 37 in pipe 25 and as seen in FIG. 3, openings 37 are staggered with respect to openings 35. A baffle 39 is secured to pipe 25 by welding or the like around each opening 37 and has its lower end terminating above and outwardly from the lower end of opening 37 (FIG. 3).

Slidably and rotatably mounted in pipe 25 is a pipe 41 having a handle 43 secured to its upper end. Pipe 41 is provided with a plurality of equally spaced apart openings formed therein which are adapted to partially register with openings 35 in pipe 25 at times. Pipe 41 is also provided with a plurality of equally spaced openings 47 formed therein which are staggered with respect to openings 45 and are adapted to partially register with openings 37 at times.

Pipe 41 is provided with a scalloped cutaway portion 49 in its upper end as best seen in FIG. 2. Secured to the upper end of pipe 25 by welding or the like is a horizontally extending discharge tube 51 which extends outwardly from bin 10 and has a closable opening 53 on its outer end. A deflecting means 55 is slidably mounted in pipe 51 (FIG. 2) and is adapted to be moved through an opening in pipe 25 and into pipe 41 through cutaway portion 49 by means of handle 57.

As best seen in FIGS. 2 and 3, a substantially cone-shaped baffle 59 is secured to the interior of pipe 25 adjacent the lower end thereof and has its lower end secured to the interior surface of pipe 25 by welding or the like and has its upper end terminating at a point between the upper and lower ends of openings 35 in pipe 25.

The normal method of operation is as follows. When the storage bin is filled to capacity with any type of grain, the grain would be resting on perforated floor 17 and control floor 35 and would have its upper level somewhat below the upper end of pipe 41. When it is desired to dry the grain, grain dryer 29 is activated to cause a large quantity of air to be forced from it into pipe 27. Pipe 27 would normally be in alignment with pipe 31 so as to receive the maximum amount of air from the grain dryer. Pipe 27 can be rotated horizontally away from the discharge end of pipe 31 so as to receive less air from grain dryer 29 if so desired. The air enters the lower end of pipe 25 and the flow of air is "pinched" down by means of baffle 59. The air would be forced upwardly through pipe 41 and impinged on grain spreader 23. It can be appreciated that when openings 37 register with openings 47, grain will enter the interior of pipe 41 therethrough. It can also be seen that when openings 35 in pipe 25 register with opening 45 in pipe 41, the grain will enter the interior of pipe 41 therethrough. It can be seen that baffle 59 prevents the grain from falling down into pipe 27. As the various openings are caused to register grain will be supplied to the interior of pipe 41 as previously described. The upwardly moving jet of air will propel the grain entering the pipes upwardly out the upper end of pipe 41 against grain spreader 23. The grain that has been discharged from pipe 41 will be deposited on the upper end of the grain within the bin. It can be appreciated that control floor 35 directs grain from the center of the bin to the interior pipe 41 while floor 17 will direct grain from the outer portions of the bin into the interior of pipe 41.

The openings in pipes 25 and 41 may be positioned as desired but they should be formed so as to provide at least four combinations, that is, (1) only openings 35 and 45 register, (2) only openings 37 and 47 register, (3) openings 35, 45 and openings 37 and 47 register simultaneously, and (4) all of the openings are closed.

It should be noted that the perforations in floor 17 permit a complete circulation of the air but do not permit the grain to fall therethrough. It should also be noted that the inherent friction between pipe 41 and pipe 25 eliminates the necessity of any elaborate suspension means of pipe 41.

The grain circulating means may also be used to discharge grain from the bin if so desired. This is accomplished by simple slidably moving deflecting means 55 into the interior of pipe 41 as previously described. The upwardly moving grain will then be deflected into pipe 51 and out closable opening 53 into a truck or the like.

Thus it can be seen that an air driven grain circulating means is provided which uniformly circulates and dries the grain within a storage bin.

Thus it can be seen that the device accomplishes at least all of its stated objectives.

Some changes may be made in the construction and arrangement of our air driven grain circulating means without departing from the real spirit and purpose of our invention, and it is our intention to cover by our claims, any modified forms of structure or use of mechanical equivalents which may be reasonably included within their scope.

We claim:

1. In a grain circulating means,
a storage bin having a top and a bottom,
a horizontal floor in said storage bin spaced above said bin bottom,
a first vertical pipe in said bin and extending downwardly through said horizontal floor,
said first pipe having a plurality of spaced apart first openings formed therein at a point above said floor,
said first pipe having a plurality of spaced apart second openings formed therein at a point above said first openings,
an inverted con-shaped control floor surrounding said first pipe and having its lower end terminating below the lower ends of said second openings,
a second pipe movably mounted in and embraced by said first pipe and having a plurality of spaced apart third and fourth openings formed therein which are adapted to register with said first and second openings respectively at times,
and air means supplying a volume of air to the interior of said second pipe.

2. The grain circulating means of claim 1 wherein said air means may be regulated to vary the volume of said air being supplied to said second pipe.

3. The grain circulating means of claim 1 wherein said second pipe is movable with respect to said first pipe so that at least some of the openings in said first pipe will register with at least some of the openings in said second pipe so that grain in said storage bin will enter the interior of said second pipe and be forced upwardly out the upper end of said second pipe by said air.

4. The grain circulating means of claim 1 wherein said horizontal floor is perforated.

5. The grain circulating means of claim 3 wherein a grain deflecting means is operatively connected to the interior of said second pipe to deflect the upwardly moving grain outside of said storage bin.

6. The grain circulating means of claim 3 wherein an inverted cone-shaped grain spread is positioned above the upper end of said second pipe to deflect the upwardly moving grain.

7. The grain circulating means of claim 1 wherein said first pipe has a baffle secured thereto adjacent each of said second openings which substantially covers the upper ends of said openings.

8. In an air driven grain circulating means,
a storage bin having a top and a bottom,
a horizontal floor in said storage bin spaced above said bin bottom thereby defining an access compartment and a storage compartment,
a first vertical pipe in said bin and having its lower end extending downwardly through said floor and terminating above said bin bottom,
said first pipe having a plurality of spaced apart first openings formed therein at a point above said floor,
said first pipe having a plurality of spaced apart second openings formed therein at a point above said first openings,
an inverted cone-shaped control floor surrounding said first pipe and having its lower end terminating below the lower ends of said second openings, the diameter of said control floor being less than the diameter of said storage bin,
a second pipe movably mounted in and embraced by said first pipe and having a plurality of spaced apart third openings and a plurality of spaced apart fourth openings formed therein which are adapted to register with said first and second openings respectively, at times to permit grain from the storage compartment to enter the interior of said second pipe,
a third pipe secured to the lower end of said first pipe and extending horizontally outwardly therefrom,
and an air means supplying a volume of air to the interior of said third pipe to force grain entering the interior of said second pipe upwardly and outwardly from the upper end thereof.

9. The grain circulating means of claim 8 wherein said first pipe has a substantially cone-shaped baffle secured to its interior to pinch down the air passing therethrough and to also prevent grain from falling downwardly in said first pipe.

10. In an air driven grain circulating means,
a storage bin having a top and a bottom,
a horizontal floor in said storage bin spaced above said bin bottom thereby defining an access compartment and a storage compartment,
a first vertical pipe in said bin and having its lower end extending downwardly through said floor and terminating above said bin bottom,
said first pipe having a plurality of spaced apart first openings formed therein at a point above said floor, said first pipe having a plurality of spaced apart second openings formed therein at a point above said first openings, an inverted cone-shaped control floor surrounding said first pipe and having its lower end terminating below the lower ends of said second openings, the diameter of said control floor being less than the diameter of said storage bin, a second pipe movably mounted in and embraced by said first pipe and having a plurality of spaced apart third openings and a plurality of spaced apart fourth openings formed therein which are adapted to register with said first and second openings respectively, at times to permit grain from the storage compartment to enter the interior of said second pipe, a third pipe secured to the lower end of said first pipe and extending horizontally outwardly therefrom, and an air means supplying a volume of air to the interior of said third pipe to force grain entering the interior of said second pipe upwardly and outwardly from the upper end thereof, said first pipe having a fourth pipe secured thereto which extends substantially horizontally outwardly therefrom to the exterior of said storage bin, said first and second pipes having registering openings so that the interior of said fourth pipe is in communication with the interior of said second pipe; a deflecting means slidably mounted in said fourth pipe adapted to be extended into the interior of said second pipe to deflect upwardly moving grain into said fourth pipe at times.

References Cited

UNITED STATES PATENTS

| | | | |
|---|---|---|---|
| 1,094,452 | 4/1914 | Mayo et al. | 34—102 |
| 1,550,992 | 8/1925 | Trump | 34—10 |
| 2,964,299 | 12/1960 | Bowers et al. | 34—10 |
| 3,078,590 | 2/1963 | Batterton et al. | 34—102 |

CHARLES J. MYHRE, *Primary Examiner.*

JOHN J. CAMBY, *Examiner.*

FREDERICK L. MATTESON, JR., *Assistant Examiner.*